United States Patent [19]

Fukuwatari

[11] Patent Number: 4,662,282

[45] Date of Patent: May 5, 1987

[54] SWITCHING DEVICE FOR PNEUMATIC CONVEYANCE LINEAR MOTOR ACTUATED

[75] Inventor: Ichiro Fukuwatari, Tochigi, Japan

[73] Assignee: Hitachi Kiden Kogyo Kabushiki Kaisha, Amagasaki, Japan

[21] Appl. No.: 711,211

[22] Filed: Mar. 13, 1985

[51] Int. Cl.⁴ .............................. B61J 1/06; B60V 1/14
[52] U.S. Cl. ..................................... 104/38; 104/23.2; 104/46; 104/47
[58] Field of Search ........................ 104/23 FS, 35–37, 104/46, 47, 290, 292, 38, 23.2; 335/272

[56] References Cited

U.S. PATENT DOCUMENTS

| | | | |
|---|---|---|---|
| 3,500,765 | 3/1970 | Easton et al. | 104/23 FS |
| 3,540,378 | 11/1970 | Giraud | 104/23 FS |
| 3,616,760 | 11/1971 | Lucien et al. | 104/23 FS |
| 3,822,652 | 7/1974 | Burdick et al. | 104/46 X |
| 3,830,160 | 8/1974 | Maison | 104/46 |
| 3,937,431 | 2/1976 | Güntner | 104/290 X |
| 4,312,276 | 1/1982 | Cory et al. | 104/38 |
| 4,326,624 | 4/1982 | Ewertowski et al. | 104/35 |
| 4,346,319 | 8/1982 | Naganuma | 335/272 X |
| 4,532,869 | 8/1985 | Kondo et al. | 104/35 X |

FOREIGN PATENT DOCUMENTS

| | | | |
|---|---|---|---|
| 1126994 | 4/1962 | Fed. Rep. of Germany | 335/272 |
| 0006300 | of 1893 | United Kingdom | 104/35 |
| 2133757 | 10/1984 | United Kingdom | 104/23 FS |

Primary Examiner—Robert B. Reeves
Assistant Examiner—Scott H. Werny
Attorney, Agent, or Firm—Wenderoth, Lind & Ponack

[57] ABSTRACT

A switching device for a transporting track on which a pallet travels supported on a cushion of air which includes a rotatable track having air jets to support the pallet and which is supported on an air bearing, a first linear motor for turning the air bearing, a second linear motor for driving and braking the pallet and a positioning device for accurately positioning the rotatable track in alignment with a fixed regular track. The switching device allows a pallet, which is supported on a cushion of air and which is driven along a fixed track by a linear motor, to be driven in a different direction by stopping the pallet on the rotatable track with a second linear motor, stopping the supply of air to the rotatable track so that the pallet is supported directly on the rotatable track, turning the air bearing and rotatable track with the first linear motor in a desired direction, accurately positioning the rotatable track with the positioner, interrupting the supply of air to the air bearing to prevent further rotation thereof, supplying air to the rotatable track to support the pallet on an air cushion and driving the pallet onto another fixed track with the second linear motor.

17 Claims, 7 Drawing Figures

SWITCHING DEVICE FOR PNEUMATIC CONVEYANCE LINEAR MOTOR ACTUATED

BACKGROUND OF THE INVENTION

1. Field of the Invention

This invention relates to a conveyor means using a linear motor for transporting precision electronic components or the like as they are caused to float in the air by air jets between manufacturing processes in a clean room, more particularly to a switching device suitable for changing the direction of a transporting pallet at a turning point of the fixed track.

2. Description of the Prior Art

As conveyor means of this kind, an endless trolley conveyor of a suspended type and other types are available. However, since these types of conveyors involve the generation of microscopic dust due to contact of movable parts, they cannot be used for the assembling of precision electronic components, manufacturing of medicines, etc. in which contamination by microscopic dust must be avoided. Under these circumstances, a conveyor means using a linear motor as a driving source is in practical use for transporting a pallet on which the transported goods are loaded as it is caused to float on an air film created by air jets. However, in the case where the destination of the transported goods extends over plural directions, a plurality of transporting tracks are required and goods for transportation must be transferred from one track to another, which requires a transferring machine of a complicated construction and of high cost.

SUMMARY OF THE INVENTION

The present invention has been made to eliminate the above disadvantage and provides a device whereby goods can be transported and changed in direction, free from contact, and also can be connected from one track to another, with high accuracy of the stop position of a rotatable track after change of direction.

In summary, the present invention provides contact-free and dust-free transportation and high accuracy of stop position by eliminating contact of the transported goods with a track by means of a bearing and a linear motor for turning purposes provided at a turning point of a rotatable track, by stabilizing transportation control by making frictional resistance almost zero and by carrying out driving, braking and positioning by a driving linear motor.

BRIEF DESCRIPTION OF THE DRAWINGS

The objects and advantages of the present invention will be understood more clearly from the following description made with reference to the accompanying drawings, in which.

DETAILED DESCRIPTION OF THE PREFERRED EMBODIMENTS

Figure 1:
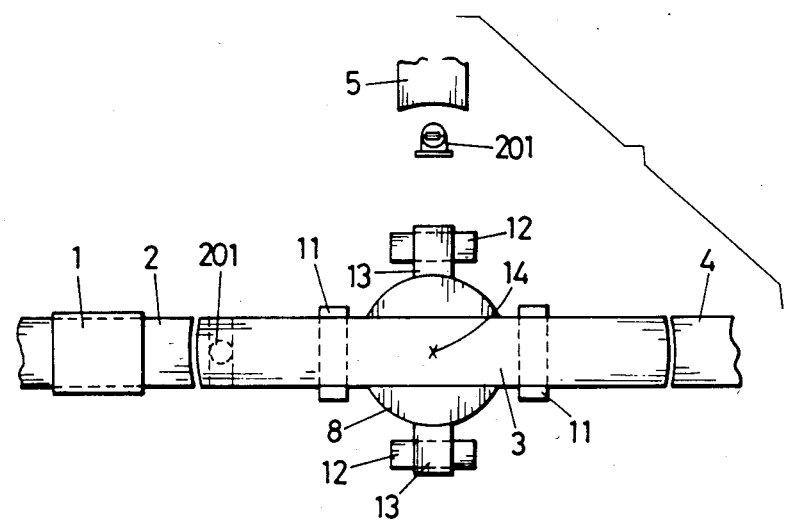
FIG. 1 is a plan view illustrating the construction of an embodiment of a device according to the present invention.
Figure 2:
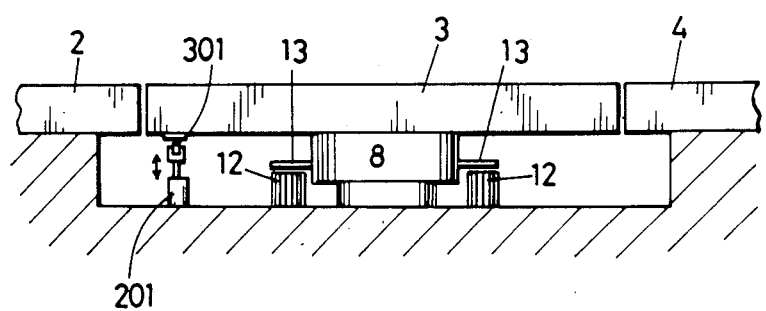
FIG. 2 is a side view of the device shown in FIG. 1.
Figure 3:
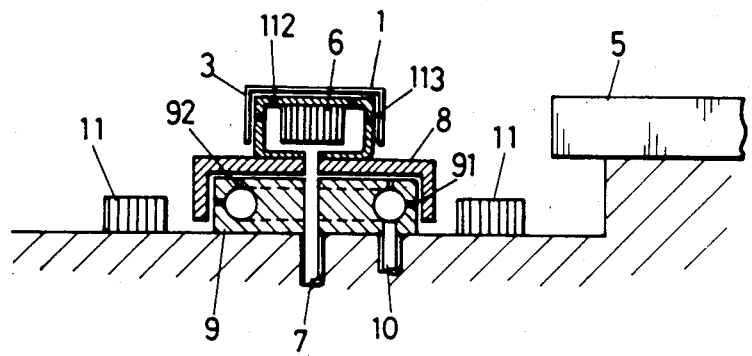
FIG. 3 is a cross sectional view of the device shown in FIG. 1.
Figure 4:
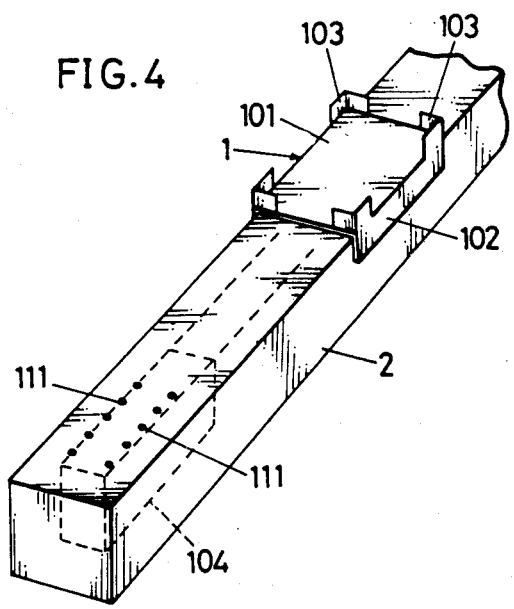
FIG. 4 is a perspective view of a fixed track.

In the drawing, numeral 1 denotes a transporting pallet. This transporting pallet 1 runs between a fixed track 2 and a fixed track 4 or between the track 2 and a fixed track 5 to reach a destination point. Each of the fixed tracks 2, 4, 5 is composed of an air duct having a plurality of air jetting nozzles 111 for floating the pallet 1 by jetting compressed air toward the upper surface of a hermetically sealed case which is a running track of the transporting pallet 1. Compressed air is supplied to each fixed track by pipe arrangements (not shown in the drawing) made at proper portions of the air duct.

The transporting pallet 1 is formed in such a fashion that it straddles the track with both sides of its flat floor surface 101 extending downwardly to form flanges 102 and frames 103 are provided at the corners of the pallet for holding the transported goods thereon. The flat floor surface 101 also serves as a reaction plate at the secondary side portions of a linear motor. In this embodiment, an aluminum plate is integrated with the bottom part of an iron plate floor surface.

Primary side portions 104 of a driving linear motor for driving the pallet along the tracks are arranged at proper intervals inside the air duct of tracks 2, 4, 5. By jetting the air from the nozzles 111, the transporting pallet 1 is caused to float in the air by the air jet from the air duct, namely, from the regular track and by the driving of a linear motor composed by the primary side portion of said linear motor and the secondary side portion of another linear motor provided at the floor surface of the transporting pallet 1, the pallet 1 is caused to run straight. Numeral 3 denotes a rotatable track arranged among the fixed tracks 2, 4, 5. The rotatable track 3 is pivotable about a center of rotation 14 so that opposite ends thereof are connectable with the fixed tracks 2, 4, 5 with a microscopic distance therebetween when they are connected. Similarly to the fixed tracks 2, 4, 5, the rotatable track 3 comprises an air duct, and primary side portion 6 of a linear motor for braking and driving the pallet on the rotatable track is provided inside the air duct at the position of its center of rotation 14. Nozzles 112, 113 of the air duct of the rotatable track 3 are provided at both side surfaces, as well as the upper surface thereof.

The rotatable track 3 is supported at a bottom part thereof on a turning bearing 8 for rotation therewith. The turning bearing 8 is formed in a hollow cylindrical shape which is rotatably mounted on a round fixed support table 9 as if it were a lid. The turning bearing 8 is supported by air pressure jetted from a plurality of nozzles 91, 92 made at the upper part and side parts of the support 9 (compressed air is supplied by a pipe 10 under the support 9). The air is jetted toward the inner surface of a circumferential wall and the inner surface of a ceiling of the turning bearing which allows it to be turned smoothly.

A pipe 7 for the supply of air to the rotatable track 3 is arranged at the center of rotation. This pipe passes through the support 9 and the turning bearing 8 and opens into the air duct in the rotatable track. Compressed air supplied from the pipe 7 is jetted from the plurality of nozzles 112, 113 made at the upper part and the side parts of the air duct and when the transporting pallet 1 is driven onto the rotatable track 3, the jetted compressed air causes the pallet 1 to float on a cushion of air.

Stationary primary side portions 11, 12 of a linear motor for the purpose of turning the rotatable track are provided at proper intervals around the outer circumference of the turning bearing 8. According to the desired switching directions, a plurality of primary side portions are installed on the floor surface diametrically opposed to each other and spaced equally from the axis of rotation (in the case of FIG. 1, a pair of primary side portions are aligned in each of two directions) on a circumference of a circle of the same radius.

Reaction plates 13 are mounted on the outside of the turning bearing 8 such that they are spaced equally from the axis of rotation and are diametrically opposed to each other in such a fashion that they cover or overlie the primary side portions 11, 12 of the linear motor for turning the rotatable track (in FIG. 1, at 90° to the axial direction of the rotatable track 3) and both are actuated to act as a linear motor for turning the rotatable track.

For carrying out turning and stopping the rotatable track accurately at a fixed position by the linear motor for turning, correcting action is necessary at the place where the rotatable track 3 is stopped and some time is required for positioning. In order to dispense with such correcting action and the time required for positioning and also to improve the accuracy of the stopped rotatable track's position, a positioner 201 is provided on a support surface for the fixed track at the desired position of stopping the rotatable track by the linear motor for turning. FIG. 1 shows, for example, the case where the transporting pallet runs from the fixed track 2 to the fixed track 5 which extends in a different direction than the fixed track 2.

Figure 5:
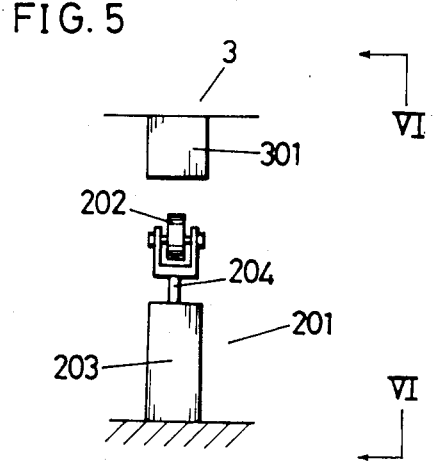
FIG. 5 is a perspective view of a positioner part.
Figure 6:
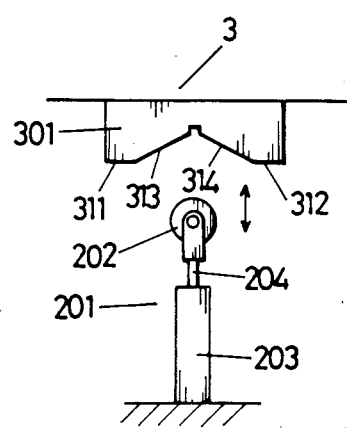
FIG. 6 is the positioner part shown in FIG. 5 as seen from the arrow direction VI—VI.
Figure 7:
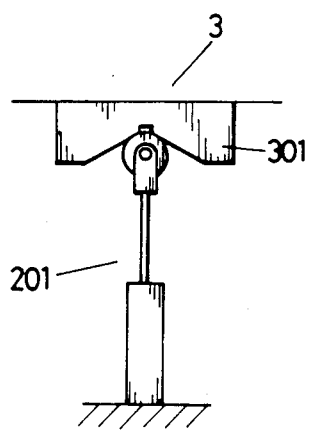
FIG. 7 is an explanatory drawing showing a state with the positioner actuated and stopped at a fixed position.

A guide 301 which is V-shaped is provided on the bottom of the rotatable track 3. This guide 301 is made flat at opposite lower ends 311, 312 in a lengthwise direction but is inclined from both flat ends towards the middle thereof to form tapered parts 313, 314. The positioner 201, as shown in FIG. 5 and FIG. 6, comprises an air cylinder 203, a rod 204 and a roller 202 which revolves on the rod. As the air cylinder 203 and the roller part 202 are connected through the medium of the rod 204, when the air cylinder 203 is actuated by an electromagnetic valve (not shown in the drawing), the roller 202 is raised by the action of the air cylinder 203 and makes contact with the tapered parts 313, 314 of the guide 301 which is positioned opposite to the air cylinder 203. Although not shown in the drawing, primary side portions 104, 6, 11, 12 of linear motors for driving, braking and turning are controlled in response to signals generated by a position detecting means.

An explanation is made below for the case where the transporting pallet 1 runs from the fixed track 2 to the fixed track 5 which has a different running direction. When the transporting pallet 1, which is driven by the driving linear motor 104 provided in the fixed track 2 as it is floating on the air jetted from the nozzles 111, enters onto the rotatable track 3, another detecting means (not shown in the drawing) detects the position of the transporting pallet 1 on the rotatable track 3.

By controlling the linear motor 6 for braking in response to the detecting signal, the transporting pallet 1 is braked and stopped on the rotatable track 3. Then, by shutting off the compressed air supplied by the pipe 7, the transporting pallet 1 is supported directly on the rotatable track 3. However, depending upon the kind of transported goods and the degree of accuracy of the stop position, direct support on the rotatable track 3 is not necessarily required.

If electric current is applied so that the primary side portions 11 generate a driving force in a reverse direction to each other, the reaction plates 13 generate thrust, whereby the turning bearing 8 turns along with the transporting pallet 1 loaded on the rotatable track and the primary side portions 12 of a linear motor provided at the desired position are actuated in such a fashion that they brake and stop the turning bearing, via the reaction plates 13, in response to signals detected by another detecting means (not shown in the drawing) to thereby stop the rotatable track in a desired position.

A detecting means (not shown in the drawing) detects that the rotatable track 3 has reached near the branching and stop position by driving of a linear motor for turning purpose and its position is within the allowable range, with the fixed position as center. At this time, this detecting means sends a signal to suitable control means which actuates the air cylinder 202 of the positioner 201 so that the roller 202 is raised and slides on either the tapered surface 313 or 314. Thus, positioning is effected at the central part of the guide 301, namely, at the fixed branching and stop position.

Upon positioning, electric current supply to the primary side of the linear motor is suspended to stop turning. After the completion of turning, the air cylinder 203 of the positioner 201 is restored, whereby the roller part 202 descends and is no longer in contact with the guide 301. Thus, the rotatable track is stopped at the desired stop position accurately and in a short time.

After the rotatable track is in a desired position, the supply of compressed air from the pipe 10 is suspended such that the turning bearing 8 ceases to float and is supported by the support 9.

Then, supply of compressed air from the pipe 7 to the air duct of the rotatable track 3 is resumed and the transporting pallet 1 is driven by actuating the linear motor 6, whereby the transporting pallet 1 advances toward the fixed track 5 and reaches the desired destination point. As one example of the means for detecting the position of arrival of the transporting pallet 1 at the turning point, it is suggested to provide a photo-interrupter having three sets of a light emitting part and a light receiving part (phototubes), of which two sets are placed in the transporting pallet at substantially equal intervals. With this arrangement, the position of the transporting pallet 1 can be detected by combination of ON and OFF of three sets of the light receiving part.

A running speed of the transporting pallet can be adjusted to the desired degree by controlling an inverter so that it supplies output of the predetermined frequency to a primary coil of a linear motor. Also, the transporting pallet can be braked by impressing voltage of an inverse phase.

A conveyor stocker, automatic storage and the like which are connected to a subsequent process can be combined optionally by a transferring machine or the like which is connected to a subsequent process at the terminal destination point.

The working procedures of the above-described transporting device, namely, each action of air jetting at a transporting track, linear motor driving, action of a linear motor for braking purpose, stop of air jetting, air jetting for floating a turning bearing, action of a linear motor for turning purpose, detection of position, stop of turning, stop of air jetting for floating a turning bearing, air jetting for floating a transporting pallet, action of a linear motor for driving purpose, etc. can be effected automatically by providing a detecting means for each action and by storing basic working patterns of the transported goods in a microcomputer.

The above description was made about the case of T-shape switching but switching is not limited to T-shape but can be done at any angle. Also, the above-described switching is applicable to a plurality of switching directions.

The shape of the roller and the shape of the bottom of the positioner are not necessarily limited to those of the above embodiment, so long as a mechanism which can determine the positions of the rotatable track and the fixed portion is adopted. Also, a solenoid or other mechanism can be used instead of the air cylinder of the positioner.

The device according to the present invention is entirely free from point contact and dust generation in each action stated above. As it does not use a speed reducer or the like as a driving source, it ensures smooth driving. Moreover, as the device makes it possible to transport goods in many branching directions with a single main transporting track, it is most suitable for transferring goods to many destination points in assembling precision electronic components, manufacturing of medicines, etc. in a clean room.

I claim:

1. A switching device for a track system wherein a pallet adapted to be loaded with goods is driven by means of a linear motor on a cushion of air from a first fixed track to a second fixed track extending in a direction different from the first fixed track, the switching device comprising:
    a rotatable track pivotable about a center of rotation from a first position at which an end of said rotatable track is adapted to connect with the first fixed track for passage of the pallet from the first fixed track to said rotatable track to a second position at which an end of said rotatable track is adapted to connect with the second fixed track for passage of the pallet from the rotatable track to the second fixed track, said rotatable track having an air duct therein and a first plurality of air jetting nozzles extending through an upper surface and spaced apart opposite side surfaces depending downwardly from said upper surface of said rotatable track for floating the pallet on a cushion of air when compressed air is supplied to said air duct, and said rotatable track including air supply means for selectively supplying compressed air to said air duct to support the pallet on a cushion of air;
    a turning bearing supporting said rotatable track for rotation therewith through any angle, said turning bearing having a pair of linear motor reaction plates disposed thereon for effecting rotation of said rotatable track supported on said turning bearing;
    a fixed support table disposed beneath said turning bearing, said fixed support table having a second plurality of air jetting nozzles directed at said turning bearing, said air jetting nozzles being connected to an air supply means for selectively supplying compressed air to said nozzles to support said turning bearing on a cushion of air and thereby allow said turning bearing to be rotated for rotating said rotatable track in a desired position;
    at least one stationary linear motor primary portion for turning said rotatable track by generating a driving force between said at least one stationary linear motor primary portion and said at least one reaction plate; and
    at least one linear motor primary portion for stopping and driving the pallet on said rotatable track, said stopping and driving linear motor primary portion being disposed within said rotatable track.

2. The switching device of claim 1, wherein said pair of reaction plates are diametrically opposed to each other and spaced equally from said axis of rotation.

3. The switching device of claim 2, wherein a pair of stationary linear motor primary portions for turning are provided, said pair of stationary turning linear motor primary portions being diametrically opposed to each other and spaced equally from said axis of rotation such that the path of said pair of reaction plates overlies said pair of stationary turning linear motor primary portions.

4. The switching device of claim 1, wherein said axis of rotation passes through said fixed support table and said turning bearing and said air supply means for supplying compressed air to said air duct includes an air supply pipe extending from said fixed support table to said air duct in said rotatable track.

5. The switching device of claim 1, wherein said fixed support table is round in shape and said turning bearing has a hollow cylindrical shape fitted over said round fixed support table.

6. The switching device of claim 5, wherein said second plurality of air jetting nozzles are provided on an upper surface and side surface of said round fixed support table.

7. The switching device of claim 1, further including positioning means for accurately adjusting the position of said rotatable track after said rotatable track has been turned to a desired position, said positioning means including a V-shaped guide disposed on an underside of said rotatable track and a positioner fixed to a support surface at a location corresponding to said desired position of said rotatable track, said positioner including a roller pivotally mounted on a rod and a means for raising and lowering said rod to engage said roller with said V-shaped guide and thereby accurately position said rotatable track in said desired position.

8. The switching device of claim 1, further including at least one stationary linear motor primary portion for braking rotation of said rotatable track by generating a braking force between said at least one stationary linear motor primary portion and said pair of reaction plates disposed on said turning bearing and positioning means for accurately adjusting the position of said rotatable track after said rotatable track has been turned to a desired position.

9. The switching device of claim 8, further comprising a pair of stationary linear motor primary portions for braking rotation of said rotatable track, said pair of stationary braking linear primary motor portions being diametrically opposed to each other and spaced equally from said axis of rotation such that the path of said pair of reaction plates overlies said pair of stationary braking linear motor primary portions.

10. A switching device for a track system wherein a pallet adapted to be loaded with goods is driven by means of a linear motor on a cushion of air from a first fixed track to a second fixed track extending in a direction different from the first fixed track, the switching device comprising:

a rotatable track pivotable about a center of rotation from a first position at which an end of said rotatable track is adapted to connect with the first fixed track for passage of the pallet from the first fixed track to said rotatable track to a second position at which an end of said rotatable track is adapted to connect with the second fixed track for passage of the pallet from the rotatable track to the second fixed track, said rotatable track haivng an air duct therein and a first plurality of air jetting nozzles extending through an upper surface and opposite, spaced apart side surfaces depending downwardly from said upper surface of said rotatable track for floating the pallet on a cushion of air when compressed air is supplied to said air duct, and said rotatable track including air supply means for selectively supplying compressed air to said air duct to support the pallet on a cushion of air;

a turning bearing supporting said rotatable track for rotation therewith through any angle, said turning bearing having a pair of linear motor reaction plates disposed thereon for effecting rotation of said rotatable track supported on said turning bearing;

a fixed support table disposed beneath said turning bearing, said fixed support table having a second plurality of air jetting nozzles directed at said turning bearing, said air jetting nozzles being connected to an air supply means for selectively supplying compressed air to said nozzles to support said turning bearing on a cushion of air and thereby allow said turning bearing to be rotated for orienting said rotatable track in a desired position;

at least one stationary linear motor primary portion for turning said rotatable track by generating a driving force between said at least one stationary linear motor primary portion and said at least one reaction plate;

at least one stationary linear motor primary portion for braking rotation of said rotatable track by generating a braking force between said at least one stationary linear motor primary portion and said at least one reaction plate disposed on said turning bearing; and at least one linear motor primary portion for stopping and driving the pallet on said rotatable track, said stopping and driving linear motor primary portion being disposed within said rotatable track.

11. The switching device of claim 10, wherein said pair of reaction plates are diametrically opposed to each other and spaced equally from said axis of rotation.

12. The switching device of claim 11, wherein a pair of stationary linear motor primary portions for turning are provided, said pair of stationary turning linear motor primary portions being diametrically opposed to each other and spaced equally from said axis of rotation such that the path of said pair of reaction plates overlies said pair of stationary turning linear motor primary portions.

13. The switching device of claim 10, wherein said axis of rotation passes through said fixed support table and said turning bearing and said air supply means for supplying compressed air to said air duct includes an air supply pipe extending from said fixed support table to said air duct in said rotatable track.

14. The switching device of claim 10, wherein said fixed support table is round in shape and said turning bearing has a hollow cylindrical shape fitted over said round fixed support table.

15. The switching device of claim 14, wherein said second plurality of air jetting nozzles are provided on an upper surface and side surface of said round fixed support table.

16. The switching device of claim 10, further including positioning means for accurately adjusting the position of said rotatable track after said rotatable track has been turned to a desired position, said positioning means including a V-shaped guide disposed on an underside of said rotatable track and a positioner fixed to a support surface at a location corresponding to said desired position of said rotatable track, said positioner including a roller pivotally mounted on a rod and a means for raising and lowering said rod to engage said roller with said V-shaped guide and thereby accurately position said rotatable track in said desired position.

17. The switching device of claim 10, further comprising a pair of stationary linear motor primary portions for braking rotation of said rotatable track, said pair of stationary braking linear motor primary portions being diametrically opposed to each other and spaced equally from said axis of rotation such that the path of said pair of reaction plates overlies said pair of stationary braking linear motor primary portions.

* * * * *